US010305876B2

(12) United States Patent
Mazandarany et al.

(10) Patent No.: US 10,305,876 B2
(45) Date of Patent: May 28, 2019

(54) SHARING BASED ON SOCIAL NETWORK CONTACTS

(71) Applicant: Microsoft Technology Licensing, LLC, Redmond, WA (US)

(72) Inventors: Darya Mazandarany, Kirkland, WA (US); Triptpal Singh Lamba, Bothell, WA (US); Shai Guday, Redmond, WA (US); David Neil MacDonald, Seattle, WA (US); Tyler Edward Hennessy, Woodinville, WA (US); Sidharth Nabar, Seattle, WA (US); Piyush Goyal, Redmond, WA (US); Gregory Thomas Caponigro, Bellevue, WA (US); Vladimir Holostov, Sammamish, WA (US); Shi Chen, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 179 days.

(21) Appl. No.: 14/071,387

(22) Filed: Nov. 4, 2013

(65) Prior Publication Data

US 2015/0127939 A1 May 7, 2015

(51) Int. Cl.
*H04L 9/32* (2006.01)
*H04L 29/06* (2006.01)
(Continued)

(52) U.S. Cl.
CPC ............... *H04L 63/08* (2013.01); *H04L 9/32* (2013.01); *H04L 63/062* (2013.01);
(Continued)

(58) Field of Classification Search
CPC ..... H04W 84/12; H04W 48/16; H04W 12/04; H04W 12/08; H04W 12/06; H04W 76/02;
(Continued)

(56) References Cited

U.S. PATENT DOCUMENTS

2007/0255837 A1* 11/2007 Hassan ................. H04L 63/104
709/227
2008/0195741 A1* 8/2008 Wynn .................... G06Q 10/10
709/229
(Continued)

FOREIGN PATENT DOCUMENTS

CN 101103354 A 1/2008
CN 102739643 A 10/2012
(Continued)

OTHER PUBLICATIONS

"Written Opinion of the International Preliminary Examining Authority for PCT Patent Application No. PCT/US/2014/063018", dated Sep. 23, 2015, 6 pages.
(Continued)

*Primary Examiner* — Trong H Nguyen
(74) *Attorney, Agent, or Firm* — Medley, Behrens & Lewis, LLC

(57) ABSTRACT

Various technologies described herein pertain to sharing Wi-Fi credentials based upon relationships in a computer-implemented social network. At least one server computing device of a Wi-Fi credential sharing service receives an identifier from a mobile device and credentials for a Wi-Fi network from the mobile device. The identifier identifies a user of the mobile device. Moreover, the credentials for the Wi-Fi network are desirably shared by the user. Further, contacts of the user are retrieved from the social network. The credentials for the Wi-Fi network are retained in respective accounts of the contacts of the user from the social (Continued)

network. Further, an account of a contact includes credentials for Wi-Fi networks shared with the contact.

19 Claims, 10 Drawing Sheets

(51) Int. Cl.
*H04W 12/04* (2009.01)
*H04W 4/21* (2018.01)
*H04W 84/12* (2009.01)
*H04W 4/12* (2009.01)

(52) U.S. Cl.
CPC ......... *H04W 12/04* (2013.01); *H04L 2209/24* (2013.01); *H04W 4/12* (2013.01); *H04W 4/21* (2018.02); *H04W 84/12* (2013.01)

(58) Field of Classification Search
CPC ...... H04W 48/00; H04W 88/08; H04L 51/32; H04L 63/102; H04L 67/30; H04L 67/303; H04L 67/306; H04L 12/588; H04L 63/083; H04L 63/062; H04L 9/32; H04L 63/105; H04L 63/107
See application file for complete search history.

(56) References Cited

U.S. PATENT DOCUMENTS

| | | | |
|---|---|---|---|
| 2009/0254980 A1 | 10/2009 | Kanaparti | |
| 2010/0132049 A1* | 5/2010 | Vernal | G06F 21/6245 726/27 |
| 2012/0110640 A1* | 5/2012 | Donelson | H04L 63/102 726/3 |
| 2012/0266217 A1* | 10/2012 | Kaal | H04L 63/0407 726/4 |
| 2013/0029597 A1 | 1/2013 | Liu et al. | |
| 2013/0029712 A1 | 1/2013 | Shao et al. | |
| 2013/0080520 A1 | 3/2013 | Kiukkonen et al. | |
| 2013/0091210 A1 | 4/2013 | Rajakarunanayake et al. | |
| 2014/0092813 A1* | 4/2014 | Jaakkola | H04W 48/16 370/328 |
| 2014/0259147 A1* | 9/2014 | L'Heureux | H04L 63/02 726/14 |
| 2015/0172925 A1* | 6/2015 | Leppanen | H04W 12/04 726/7 |

FOREIGN PATENT DOCUMENTS

| | | |
|---|---|---|
| CN | 103117906 A | 5/2013 |
| WO | 2012164328 A1 | 12/2012 |
| WO | 2013154493 A1 | 10/2013 |

OTHER PUBLICATIONS

"Response to International Search Report (ISR) and Written Opinion for PCT Patent Application No. PCT/US/2014/063018", dated May 4, 2015, 11 pages.

Seada, et al., "Social Networks: The Killer App for Wireless Ad Hoc Networks?," Retrieved at <<http://research.nokia.com/files/tr/NRC-TR-2006-010,pdf>>, Nokia Research Center NRC-TR-2006-010, Aug. 11, 2006, pp. 1-7.

"International Search Report and Written Opinion Issued in PCT Application No. PCT/US2014/063018", dated Jan. 20, 2015, 12 Pages.

"International Preliminary Report on Patentability Issued in PCT Application No. PCT/US2014/063018", dated Jan. 29, 2016, 7 Pages.

"Office Action Issued in European Patent Application No. 14799084.0", dated Jan. 5, 2018, 4 Pages.

"Office Action Issued in European Patent Application No. 14799084.0", dated Jun. 21, 2018, 5 Pages.

"First Office Action Issued in Chinese Patent Application No. 201480060521.4", dated Jul. 27, 2018, 13 Pages.

"Second Office Action Issued in Chinese Patent Application No. 201480060521.4", dated Feb. 22, 2019, 12 Pages.

\* cited by examiner

SHARING BASED ON SOCIAL NETWORK CONTACTS

BACKGROUND

Wireless fidelity (Wi-Fi) networks have generally increased in popularity. By way of example, Wi-Fi networks have become more prevalent in homes, businesses, public areas, and so forth. A computing device, for instance, can connect to and exchange data via a Wi-Fi network. When connected to the Wi-Fi network, the computing device may use and/or access various network resources made available on the Wi-Fi network, such as the Internet, network attached storage, printers, other computing devices on the Wi-Fi network, and so forth.

A Wi-Fi network typically has a set of credentials utilized to enable access to such Wi-Fi network. The credentials, for instance, can include a service set identifier (SSID), a basic service set identifier (BSSID), a network key, and so forth. For instance, the network key can be a Wired Equivalent Privacy (WEP) key, a Wi-Fi Protected Access (WPA) key, a Wi-Fi Protected Access II (WPA2) key, a Counter Cipher Mode with Block Chaining Message Authentication Code Protocol (CCMP) key, an Advanced Encryption Standard (AES) key, or the like. As an example, credentials for a particular Wi-Fi network can include an SSID and WPA key that can be used by a computing device to identify and access the particular Wi-Fi network associated with the SSID.

Conventional approaches for distributing Wi-Fi credentials oftentimes involve an owner of a Wi-Fi network (or someone else who has knowledge of the Wi-Fi credentials) providing the Wi-Fi credentials to a disparate user to enable the disparate user to access the Wi-Fi network. By way of illustration, an owner of a Wi-Fi network can provide a disparate user with the Wi-Fi credentials for the Wi-Fi network at his house when the disparate user comes to visit. Yet, it may be difficult for the owner to remember the Wi-Fi credentials, distracting to the owner to be interrupted by the disparate user who desires to access the Wi-Fi network, and time-consuming for both the owner and the disparate user.

SUMMARY

Described herein are various technologies that pertain to social network based sharing of Wi-Fi credentials. The Wi-Fi credentials can be shared based on contacts from a social network (or a plurality of social networks). According to various embodiments, at least one server computing device can be configured to receive an identifier from a first mobile device. The identifier can identify a user of the first mobile device. Moreover, the at least one server computing device can receive credentials for a Wi-Fi network from the first mobile device. The credentials for the Wi-Fi network can be desirably shared by the user. Further, contacts of the user can be retrieved from a computer-implemented social network based upon the identifier. The credentials for the Wi-Fi network can be retained in respective accounts of the contacts of the user from the social network. An account of a contact can include credentials for Wi-Fi networks shared with the contact.

According to various embodiments, the at least one server computing device can receive a credential request from a second mobile device. The credential request can include data that identifies the contact (e.g., a user of the second mobile device). An account of the contact can be identified based upon the data that identifies the contact. Moreover, a geographic location of the second mobile device can be identified responsive to receiving the credential request. Responsive to identifying the account of the contact and the geographic location of the second mobile device, a subset of the credentials for the Wi-Fi networks shared with the contact within geographic proximity of the second mobile device can be determined based upon the geographic location of the second mobile device. The subset of the credentials for the Wi-Fi networks shared with the contact within geographic proximity can be transmitted to the second mobile device.

In accordance with various embodiments, a mobile device can share credentials for Wi-Fi networks with other users based upon social network relationships. A user of the mobile device can control which Wi-Fi networks are shared with the other users based upon the social network relationships and which Wi-Fi networks are not shared. The mobile device can receive authorization for sharing credentials of a Wi-Fi network retained in a data repository of the mobile device with contacts of the user of the mobile device. The contacts of the user can be from a computer-implemented social network. Moreover, the mobile device can transmit social network credentials and/or a social network token of the user for the social network to the at least one server computing device. Further, the mobile device can encrypt the credentials for the Wi-Fi network and transmit encrypted credentials for the Wi-Fi network to at least one server computing device. According to an example, the mobile device can control rights of the contacts on the Wi-Fi network when respective mobile devices of the contacts connect to the Wi-Fi network utilizing the credentials.

In accordance with various embodiments, a mobile device can obtain and use Wi-Fi credentials shared with such mobile device by other users based upon relationships in a social network. The mobile device can transmit a credential request to at least one server computing device. Further, the mobile device can receive, responsive to the credential request, a subset of credentials for Wi-Fi networks shared with a user of the mobile device by contacts of the user. The subset of the credentials can be for the Wi-Fi networks within geographic proximity of the mobile device. The contacts of the user can be from a computer-implemented social network. Moreover, the mobile device can connect to a particular Wi-Fi network from the Wi-Fi networks utilizing corresponding credentials received from the at least one server computing device. For example, rights of the mobile device when connected to the particular Wi-Fi network utilizing the corresponding credentials can be restricted (e.g., the corresponding credentials can allow Internet access through the particular Wi-Fi network while inhibiting access to disparate networks resources of the particular Wi-Fi network, etc.).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
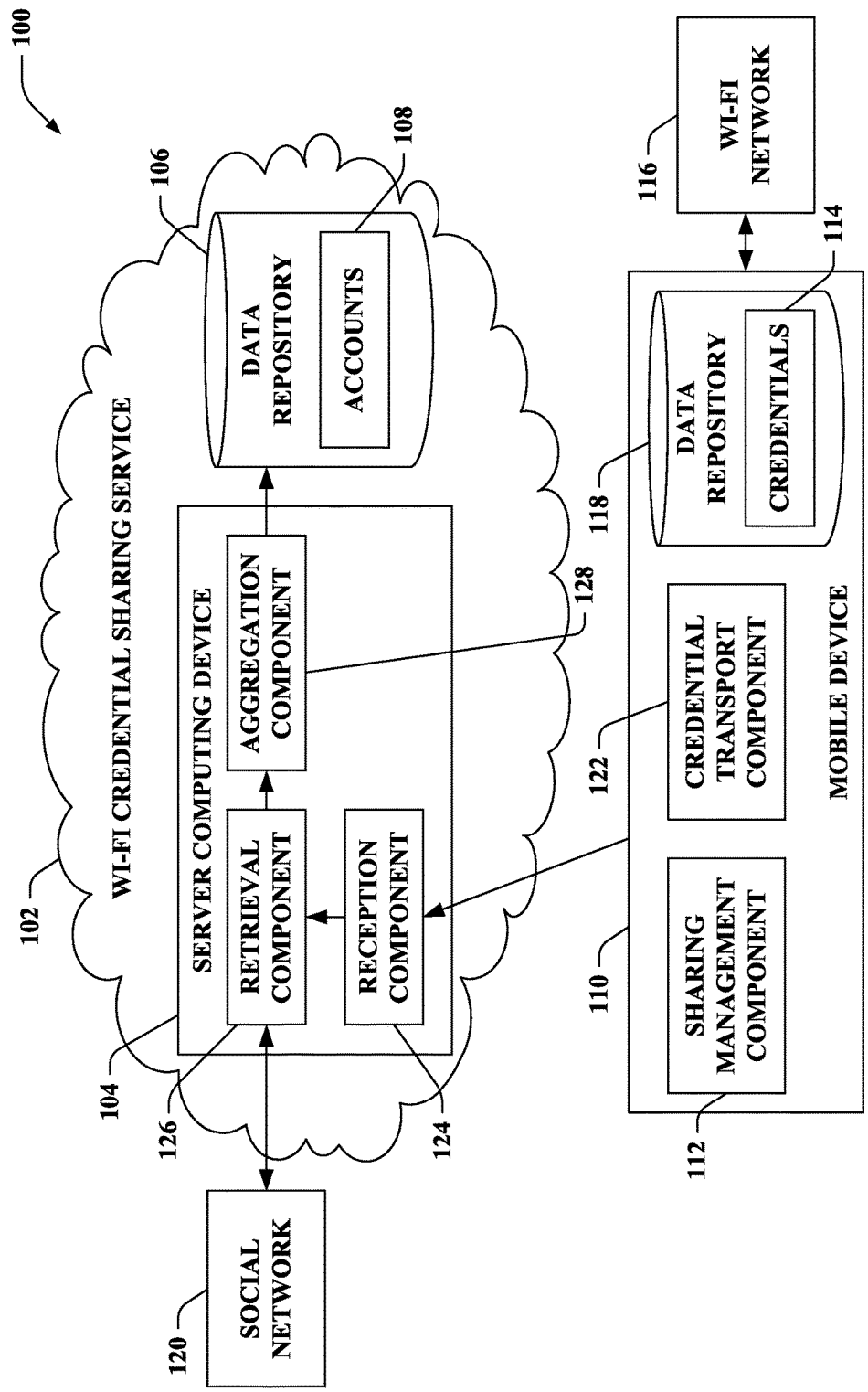
FIG. 1 illustrates a functional block diagram of an exemplary system that employs social network based sharing of Wi-Fi credentials.

Various technologies pertaining to sharing Wi-Fi credentials based upon social network relationships are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that employs social network based sharing of Wi-Fi credentials. The system 100 includes a Wi-Fi credential sharing service 102, which further includes at least one server computing device 104 and a data repository 106. While many of the examples set forth below describe the Wi-Fi credential sharing service 102 including one server computing device, it is contemplated that the Wi-Fi credential sharing service 102 can include a plurality of server computing devices.

The data repository 106 can retain accounts 108 for users. An account of a user can include credentials for Wi-Fi networks shared with the corresponding user. According to an example, credentials for a Wi-Fi network shared with a particular user can include an SSID, a BSSID, a network key, a location, and so forth for the Wi-Fi network. Moreover, the credentials can be encrypted in the data repository 106.

The system 100 further includes a mobile device 110. The mobile device 110, for example, can be a mobile phone (e.g., smart phone), a tablet computer, a handheld computer, a laptop computer, a wearable computer, a personal digital assistant (PDA), a portable gaming device, an in-vehicle communications and infotainment system, or the like.

The mobile device 110 can include a sharing management component 112 that receives authorization for sharing credentials 114 of a Wi-Fi network 116 retained in a data repository 118 of the mobile device 110 with contacts of a user of the mobile device 110. The contacts of the user can be from a computer-implemented social network 120. The social network 120, for instance, can be a social network service, a voice-over-IP service, an instant messaging service, an email service, or the like; thus, the contacts of the user can be from a contact list maintained by the social network 120. Moreover, the sharing management component 112 can transmit social network credentials and/or a social network token of the user for the social network 120 to the server computing device 104. According to an example, the social network credentials and/or the social network token of the user for the social network 120 can be encrypted by the sharing management component 112 prior to transmission to the server computing device 104. The social network credentials and/or the social network token can be utilized to obtain the contacts of the user from the social network 120.

The sharing management component 112, for instance, can obtain the user access token from the social network 120. Following this example, the social network token of the user for the social network 120 can be transmitted to the server computing device 104. Yet, it is to be appreciated that the social network credentials of the user of the mobile device 110 can additionally or alternatively be transmitted by the sharing management component 112 to the server computing device 104.

The mobile device 110 further includes a credential transport component 122 that encrypts the credentials 114 for the Wi-Fi network 116. Moreover, the credential transport component 122 transmits the encrypted credentials for the Wi-Fi network 116 to the server computing device 104.

The server computing device 104 includes a reception component 124 that receives an identifier from the mobile device 110. The identifier identifies a user of the mobile device 110. The identifier, for example, can correspond to an account of the user maintained by the Wi-Fi credential service 102. For instance, the identifier can include the social network credentials and/or the social network token of the user for the social network 120. Further, the reception component 124 can receive the credentials 114 for the Wi-Fi network 116 from the mobile device 110. The credentials 114 for the Wi-Fi network 116 are desirably shared by the user of the mobile device 110.

The server computing device 104 also includes a retrieval component 126 that retrieves contacts of the user from the computer-implemented social network 120 based upon the identifier received from the mobile device 110. For instance, the contacts of the user can be retrieved by the retrieval component 126 from the social network 120 utilizing the social network credentials and/or the social network token of the user for the social network 120. According to an example, the retrieval component 126 can retrieve the contacts of the user from the social network 120 by querying a public graph application programming interface (API) for the social network 120 with the social network token of the user; yet, the claimed subject matter is not so limited.

Moreover, the server computing device 104 includes an aggregation component 128 that retains the credentials 114 for the Wi-Fi network 116 in respective accounts 108 of the contacts of the user from the social network 120. For instance, an account (e.g., one of the accounts 108) of a contact can include credentials for Wi-Fi networks shared with the contact.

According to an illustration, the sharing management component 112 can prompt the user of the mobile device 110 to opt in to enable sharing of Wi-Fi credentials with contacts of the user from the social network 120. Moreover, it is to be appreciated that the sharing management component 112 can similarly prompt the user to opt in to enable sharing with contacts from substantially any number of social networks in addition to the social network 120 (and/or sharing contacts from an address book, etc.). Accordingly, authorization for sharing the credentials 114 can be received by the sharing management component 112 for one or more of the social networks. Based upon the received authorization, the credentials 114 can be shared with contacts from the selected one or more social networks.

In accordance with an illustration, the sharing management component 112 can prompt the user to opt in to enable sharing of Wi-Fi credentials with contacts from the social network 120. Such sharing can be a recommended setting; yet, the claimed subject matter is not so limited. Upon the user authorizing sharing with the contacts from the social network 120 (and/or disparate social networks), the sharing management component 112 can register the mobile device 110 (and/or the user of the mobile device 110) with the Wi-Fi credential sharing service 102. Responsive to registration of the mobile device 110, the Wi-Fi credential sharing service 102 can create an account for the mobile device 110 (and/or the user of the mobile device 110) in the data repository 106.

For instance, the sharing management component 112 can receive authorization for sharing the credentials 114 of the Wi-Fi network 116 retained in the data repository 118 of the mobile device 110 with contacts of the user from a disparate computer-implemented social network (not shown). The sharing management component 112 can accordingly transmit social network credentials and/or a social network token of the user for the disparate social network to the server computing device 104. The social network credentials and/or the social network token of the user for the disparate social network can similarly be employed by the server computing device 104 as described above with respect to the social network credentials and/or the social network token of the user for the social network 120.

Pursuant to an example, the credential transport component 122 of the mobile device 110 can transmit a set of credentials for Wi-Fi networks shared by the user from the mobile device 110 (e.g., the set of credentials for the Wi-Fi networks can include the credentials 114 for the Wi-Fi network 116, the set of credentials can be retained in the data repository 118 of the mobile device 110). The reception component 124 of the server computing device 104 can receive the set of credentials for the Wi-Fi networks shared by the user from the mobile device 110. Further, the aggregation component 128 can retain the set of credentials for the Wi-Fi networks shared by the user in the respective accounts 108 of the contacts of the user from the social network 120.

The credentials shared by the mobile device 110 can change over time. For instance, credentials for a newly added Wi-Fi network can be shared by the user of the mobile device 110. According to another example, credentials can be updated over time (e.g., responsive to alteration of a network key, etc.). By way of a further example, credentials for a previously shared Wi-Fi network can be discontinued from being shared by the user of the mobile device 110. For instance, credentials for a previously shared Wi-Fi network can be revoked from individuals or a set of users (e.g., the contacts of the user of the mobile device 110 from the social network 120).

According to an example, the credential transport component 122 can transmit an update from the mobile device 110 to the server computing device 104. The update can desirably revoke the credentials 114 for the Wi-Fi network 116 from being shared by the user of the mobile device 110. The reception component 124 can receive the update from the mobile device 110. Moreover, the aggregation component 128 can remove the credentials 114 for the Wi-Fi network 116 from the respective accounts of the contacts of the user from the social network 120. It is further contemplated that similar updates can be exchanged to add credentials to be shared with contacts of the user of the mobile device 110 or alter previously shared credentials.

By way of another example, the credential transport component 122 can transmit an updated set of credentials for Wi-Fi networks shared by the user of the mobile device 110. The updated set of credentials, for instance, can include added credentials for Wi-Fi networks, altered credentials for Wi-Fi networks, and/or removed credentials for Wi-Fi networks (e.g., credentials revoked from being shared by the user of the mobile device 110). The updated set of credentials can also include credentials for Wi-Fi networks shared by the user of the mobile device 110 that are unchanged since a prior transmission of a set of credentials. Thus, the reception component 124 can receive the updated set of credentials for Wi-Fi networks shared by the user from the mobile device 110. Further, the aggregation component 128 can replace the set of credentials for the Wi-Fi network shared by the user of the mobile device 110 with the updated set of credentials for the Wi-Fi network shared by the user of the mobile device 110 in the respective accounts 108 of the contacts of the user from the social network 120.

Moreover, the contacts of the user of the mobile device 110 in the social network 120 can change over time. Thus, the retrieval component 126 can update the contacts of the user retrieved from the social network 120. It is to be appreciated that the contacts can be updated periodically, continuously, in response to received information obtained from the mobile device 110, and so forth. According to an example, the contacts of the user of the mobile device 110 from the social network 120 can be updated by the retrieval component 126 on a daily basis; however, the claimed subject matter is not so limited. Upon updating the contacts of the user from the social network 120, the aggregation component 128 can update the accounts 108 retained in the data repository 106 (e.g., re-run a social graph and exchange credentials for Wi-Fi networks between accounts of users identified as contacts who have both opted in, etc.).

The group of users with whom the credentials 114 of the Wi-Fi network 116 are shared can be based upon relationships in the social network 120. Moreover, relationships in multiple social networks can be used to determine the group of users with whom the credentials 114 of the Wi-Fi network 116 are shared. Sharing of the credentials 114 of the Wi-Fi network 116 can be one-way (e.g., the user of the mobile device 110 can share the credentials 114 for the Wi-Fi network 116 with a contact of the user from the social network 120, while the contact need not share credentials for Wi-Fi network(s) with the user of the mobile device 110). By way of another example, reciprocal sharing can be supported by the Wi-Fi credential sharing service 102. Thus, the credentials 114 of the Wi-Fi network 116 can be shared with contacts of the user of the mobile device 110, which respectively share credentials for Wi-Fi networks with the user of the mobile device 110.

The aggregation component 128 can determine a subset of the contacts of the user from the social network 120 that have accounts 108 in the data repository 106 of the Wi-Fi credential sharing service 102. The subset of the contacts of the user from the social network 120 that have accounts 108 can be contacts that have registered with the Wi-Fi credential sharing service 102 (e.g., opted in for sharing). Further, the aggregation component 128 can retain the credentials 114 for the Wi-Fi network 116 in such accounts 108.

By way of example, once the user of the mobile device 110 has opted in to share with contacts from the social network 120, credentials for the Wi-Fi networks that have been entered into the mobile device 110 for the Wi-Fi networks to which the mobile device 110 can connect are transmitted by the credential transport component 122 to the server computing device 104 for sharing with the contacts from the social network 120. It is contemplated, however, that credentials for a subset of such Wi-Fi networks can be inhibited from being shared with contacts of the user of the mobile device 110. Examples of types of such Wi-Fi networks for which sharing can be inhibited include enterprise-provisioned networks, Wireless Internet Service Provider Roaming (Wispr) based networks (e.g., mobile operator hotspots), Extensible Authentication Protocol (EAP) based networks (e.g., corporate wireless local area networks (WLANs)), paid networks, unauthenticated networks, and so forth.

As noted above, the credential transport component 122 can encrypt the credentials for the Wi-Fi networks shared by the mobile device 110. When sending the credentials for the Wi-Fi networks to the server computing device 104, uploading effectuated by the credential transport component 122 can be time bounded (e.g., the credentials can desirably be uploaded within 24 hours of being added, altered, removed, etc.). Moreover, the credential transport component 122 can desirably send the encrypted credentials for the Wi-Fi networks to the server computing device 104 over a Wi-Fi network, if available; yet, the claimed subject matter is not so limited.

Further, the sharing management component 112 of the mobile device 110 can control rights of the contacts on the Wi-Fi network 116 when respective mobile devices of the contacts connect to the Wi-Fi network 116 utilizing the credentials 114. For instance, the rights of the contacts on the Wi-Fi network 116 can vary as a function of a parameter (or a plurality of parameters). Examples of parameters include degree of relationship in a social network, bandwidth, time, time of day, day of week, proximity, dynamic usage, application for which bandwidth is employed, network, blacklist and/or whitelist of groups or users, quota, percent relative to a bandwidth cap, price, domain, network type or provider, or the like. It is contemplated that a one touch configuration can be utilized to set the parameters; yet, the claimed subject matter is not so limited.

By way of example, bandwidth usable by a contact in the social network 120 can be tied to a degree of the relationship with the contact (e.g., a first-degree contact can be provided with greater bandwidth as compared to a second-degree contact, etc.). According to another example, social blacklists can be utilized to set attributes of users that are not able to access the Wi-Fi network 116 shared by the user of the mobile device 110.

Moreover, the sharing management component 112 can control rights of the contacts of the user of the mobile device 110 on the Wi-Fi network 116 shared with such contacts. According to an example, shared access to the Wi-Fi network 116 can be restricted to Internet-only (e.g., no local subnet access) for some or all users with whom the Wi-Fi network 116 is shared. According to another example, a first subset of network resources of the Wi-Fi network 116 can be shared, while a second subset of the network resources of the Wi-Fi network 116 can be inhibited from being shared by the sharing management component 112 (e.g., resources can be selectively shared by the sharing management component 112).

Figure 2:
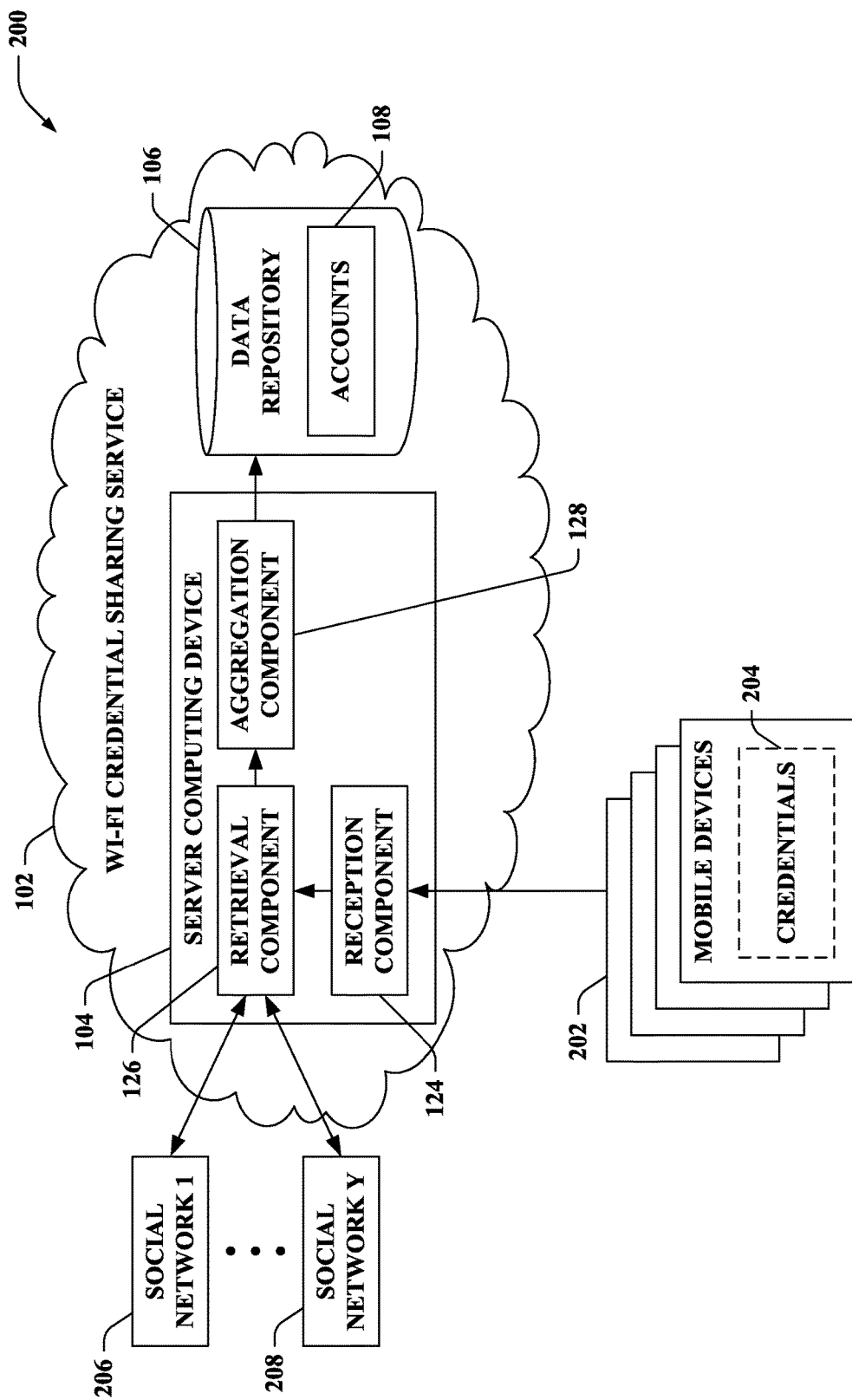
FIG. 2 illustrates a functional block diagram of an exemplary system that shares credentials for Wi-Fi networks based upon relationships in social networks.

Now turning to FIG. 2, illustrated is a system 200 that shares credentials for Wi-Fi networks based upon relationships in social networks. The system 200 includes the Wi-Fi credential sharing service 102, which includes the at least one server computing device 104 and the data repository 106. As illustrated, the reception component 124 can receive identifiers from a plurality of mobile devices 202 (e.g., the identifiers can include social network credentials and/or social network tokens). Moreover, the reception component 124 can receive respective credentials 204 for Wi-Fi networks from the plurality of mobile devices 202.

Each of the mobile devices 202 can respectively allow sharing of the credentials 204 with contacts from one or more social networks. In particular, each of the mobile devices 202 can specify whether to share the credentials 204 with respective contacts from one or more of a social network 1 206, . . . , and/or a social network Y 208 (collectively referred to as social networks 206-208), where Y can be substantially any integer greater than or equal to two. Moreover, the system 200 can be extensible to other social network(s) in addition to the social networks 206-208. According to an example, a first mobile device can allow sharing with contacts from the social network 1 206, a second mobile device can allow sharing with contacts from the social network Y 208, and a third mobile device can allow sharing with contacts from both the social network 1 206 and the social network Y 208.

According to an example, a particular one of the mobile devices 202 can transmit credentials for a Wi-Fi network to the server computing device 104. The reception component 124 can receive the credentials for the Wi-Fi network from the particular mobile device. Moreover, the retrieval component 126 can retrieve contacts of a user of the particular mobile device from a first social network (e.g., the social network 1 206) and a second social network (e.g., the social network Y 208) based upon the identifier received from the mobile device. Further, the aggregation component 128 can retain the credentials for the Wi-Fi network in respective accounts of the contacts of the user from the first social network and the second social network.

The aggregation component 128 can employ relationships from multiple social networks 206-208 to determine the contacts with which the credentials 204 for Wi-Fi networks are shared. For example, if a mobile device allow sharing with contacts from two social networks (e.g., the social network 1 206 and the social network Y 208), then the aggregation component 128 can retain the credentials 204 from such mobile device in the accounts 108 of the contacts retrieved from either of the social networks (e.g., a union of the contacts). According to another example where the mobile device authorizes sharing with contacts from two social networks, the aggregation component 128 can retain the credentials 204 from such mobile device in the accounts 108 of the contacts that are retrieved from both social networks (e.g., intersection of the contacts).

Moreover, the aggregation component 128 can inhibit retaining duplicate credentials in an account. For instance, if two mobile devices share credentials for a common Wi-Fi network, then the aggregation component 128 can retain one instance of the credentials in an account of a particular user, where the particular user is a contact of users of both of the mobile devices sharing the credentials. Further, the aggregation component 128 can retain information that identifies which of the users initially shared the credentials to the particular user, bandwidth shared by each of the users, etc., for example; such information can be distributed to the mobile device of the particular user along with the credentials.

Figure 3:
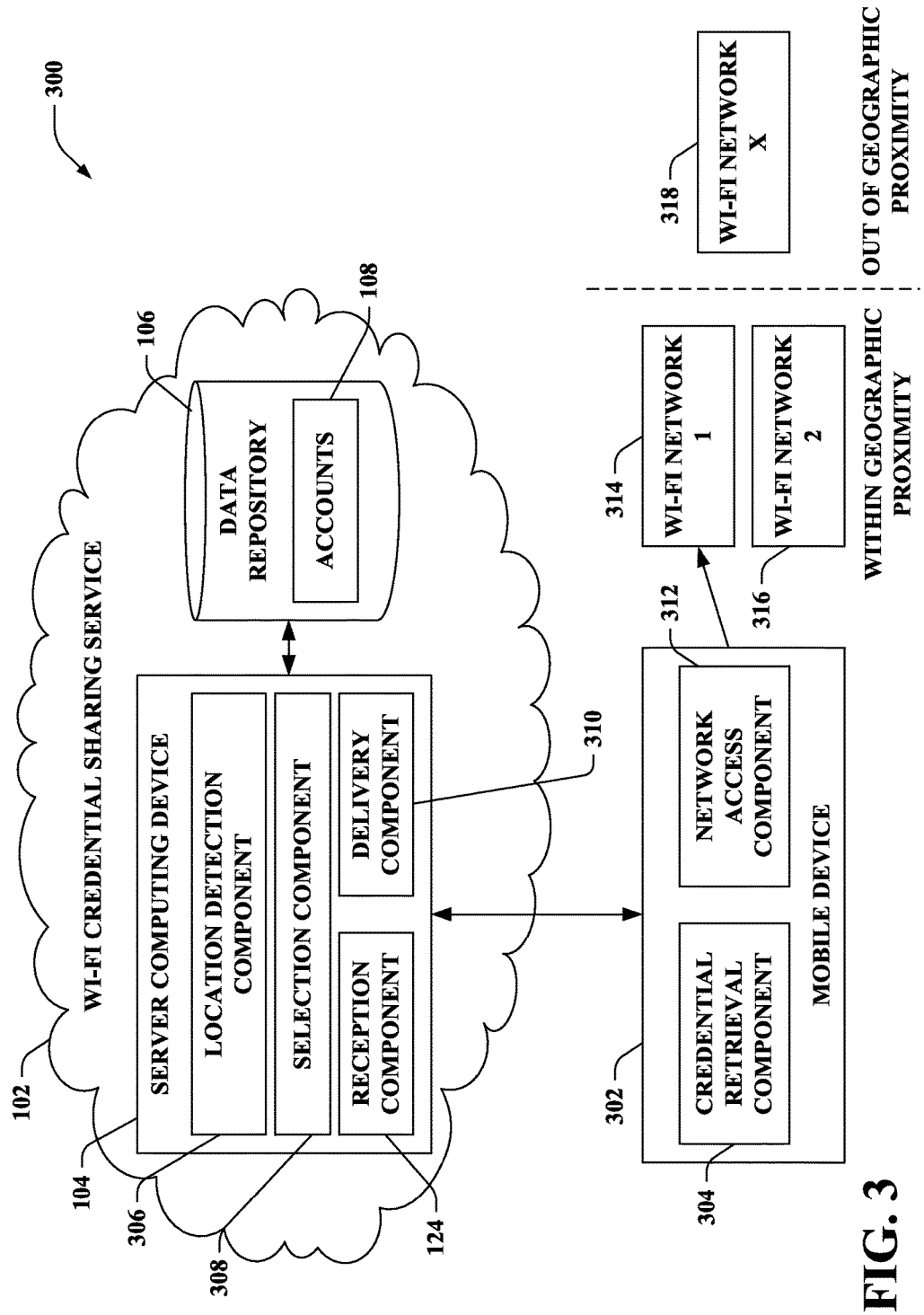
FIG. 3 illustrates a functional block diagram of an exemplary system that distributes credentials for Wi-Fi networks shared based upon social network relationships.

With reference to FIG. 3, illustrated is a system 300 that distributes credentials for Wi-Fi networks shared based upon social network relationships. The system 300 includes the Wi-Fi credential sharing service 102, which further includes the one or more server computing devices 104 and the data repository 106. The server computing device 104 includes the reception component 124. Moreover, although not shown, the server computing device 104 can include the retrieval component 126 and the aggregation component 128.

The system 300 includes a mobile device 302 (e.g., the mobile device 110 of FIG. 1, a disparate mobile device). Although not shown, it is contemplated that the mobile device 302 can include the sharing management component 112 and/or the credential transport component 122 of FIG. 1. The mobile device 302 can include a credential retrieval component 304 that can transmit a credential request from the mobile device 302 to the server computing device 104. The credential request can include data that identifies the mobile device 302 (e.g., data that identifies a user of the mobile device 302, data that identifies a contact, etc.). The credential request, for instance, can indicate that the mobile device 302 desirably receives credentials for shared Wi-Fi networks.

The server computing device 104 can include the reception component 124, which can receive the credential request from the mobile device 302. Moreover, the server computing device 104 can identify an account of the user of the mobile device 302 based upon the data that identifies the user included in the credential request. The server computing device 104 can further include a location detection component 306 that can identify a geographic location of the mobile device 302 responsive to receiving the credential request.

The server computing device 104 can also include a selection component 308. Responsive to identifying the account of the user of the mobile device 302 and the geographic location of the mobile device 302, the selection component 308 can determine a subset of the credentials for the Wi-Fi networks shared with the user of the mobile device 302 within geographic proximity of the mobile device 302 based upon the geographic location of the mobile device 302. The server computing device 104 can further include a delivery component 310 that transmits the subset of the credentials for the Wi-Fi networks shared with the user of the mobile device 302 within geographic proximity to the mobile device 302.

The credential retrieval component 304 of the mobile device 302 can receive, from the server computing device 104, the credentials for the Wi-Fi networks shared with the user of the mobile device 302 by contacts of the user from social network(s). The mobile device 302 can further include a network access component 312 that can connect the mobile device 302 to a particular Wi-Fi network from the Wi-Fi networks utilizing corresponding credentials received from the server computing device 104. For instance, the network access component 312 can automatically connect to the particular Wi-Fi network, connect responsive to user input, and so forth. Moreover, rights of the user of the mobile device 302 on a particular Wi-Fi network can be varied as a function of a parameter when connected to the particular Wi-Fi network utilizing the credentials received from the Wi-Fi credential sharing service 102.

Thus, responsive to transmission of the credential request, the credential retrieval component 304 can receive a subset of credentials for Wi-Fi networks within geographic proximity of the mobile device 302. The subset of the credentials for the Wi-Fi networks can be shared with the user of the mobile device 302 by contacts of the user, where the contacts of the user are from a computer-implemented social network (or a plurality of such social networks).

Further, the delivery component 310 of the server computing device 104 can transmit time-to-live data to the mobile device 302. The time-to-live data can control a lifespan during which the Wi-Fi networks are accessible to the mobile device 302 with the subset of the credentials for the Wi-Fi networks transmitted by the delivery component 310 to the mobile device 302. According to an example, the time-to-live data can specify a duration of time during which the Wi-Fi networks can be accessed by the mobile device 302. By way of another example, the time-to-live data can specify a number of accesses that can be carried out by the mobile device 302.

The system 300 can pre-deliver credentials for Wi-Fi networks that are within a limited geographic region or within proximity of the mobile device 302. According to an example, an account of the user of the mobile device 302 (e.g., from the accounts 108) can include credentials for a Wi-Fi network 1 314, a Wi-Fi network 2 316, . . . , and a Wi-Fi network X 318, where X can be substantially any integer greater than two. As shown in FIG. 3, the credentials for the Wi-Fi network 1 314 and the Wi-Fi network 2 316 can be delivered by the delivery component 310 to the mobile device 302.

The location detection component 306 can determine Wi-Fi networks that are within geographic proximity of the mobile device 302 based upon the identified geographic location of the mobile device 302. For instance, geographic proximity can be within a common spatial region, such as a common country, region of a country, state, region of a state, county, city, region of the city, neighborhood, street, or the like as compared to the mobile device 302. According to another example, geographic proximity can be within a predefined distance of the mobile device 302. By way of yet another example, geographic proximity can be the T nearest located shared Wi-Fi networks to the mobile device 302, where T can be substantially any integer.

According to the illustrated example shown in FIG. 3, the location detection component 306 can determine that the mobile device 302 is within geographic proximity of the Wi-Fi network 1 314 and the Wi-Fi network 2 316, while being outside of geographic proximity of the Wi-Fi network X 318, based at least in part upon the geographic location of the mobile device 302. Following this example, the selection component 308 can determine that the subset of the credentials for the Wi-Fi networks to be shared with the mobile device 302 include credentials for the Wi-Fi network 1 314 and the Wi-Fi network 2 316, while the credentials for the Wi-Fi network X 318 can be excluded from the subset of the credentials. Thereafter, the delivery component 310 can transmit the subset of the credentials for the Wi-Fi networks shared with the user of the mobile device 302 within geographic proximity of the mobile device 302 (e.g., transmit the credentials for the Wi-Fi network 1 314 and the Wi-Fi network 2 316). Further, the delivery component 310 can be inhibited from delivering credentials for the Wi-Fi network X 318 to the mobile device 302.

The credential retrieval component 304 of the mobile device 302 can receive the credentials for the Wi-Fi networks from the server computing device 104 that are within geographic proximity of the mobile device 302. Further, the network access component 312 can select to access a particular Wi-Fi network from the Wi-Fi networks. As depicted in FIG. 3, the network access component 312 can select to access the Wi-Fi network 1 314. The network access component 312 can select to access the particular Wi-Fi network based upon geographic locations of the Wi-Fi networks for which respective credentials are received, signal strength of the shared Wi-Fi networks for which respective credentials are received, available bandwidths supplied by the Wi-Fi networks for which respective credentials are received, network quality (e.g., measured by mobile devices after connecting to the Wi-Fi networks, reported back to the Wi-Fi sharing service 102, and distributed to the mobile device 302), user input, preset preferences, or the like. Further, the network access component 312 can access the particular Wi-Fi network using respective credentials for the particular Wi-Fi network received from the server computing device 104.

The credentials of the Wi-Fi networks within geographic proximity of the mobile device 302 can be pre-cached on the mobile device 302 (e.g., the credentials of the Wi-Fi network 1 314 and the Wi-Fi network 2 316 can be pre-cached on the mobile device 302). By way of illustration, when the mobile device 302 is geographically located in a first city, a first set of credentials for a first set of shared Wi-Fi networks can be pre-delivered by the delivery component 310 to the mobile device 302 based upon the location detection component 306 detecting that the mobile device 302 is within the first city. Since the first set of credentials are pre-cached on the mobile device 302, while the mobile device 302 is located in the first city, the network access component 312 can use credentials from the first set of credentials to access one or more of the Wi-Fi networks in the first set of shared Wi-Fi networks (e.g., without subsequent transmission of credentials by the delivery component 310, etc.). Following this illustration, the location detection component 306 can thereafter identify that the mobile device 302 has moved to a second city. Accordingly, a second set of credentials for a second set of Wi-Fi networks can be pre-delivered to the mobile device 302 based upon the location detection component 306 detecting the mobile device 302 within the second city, and so forth.

By way of example, geospatial tiles can be retained in the data repository 106 (e.g., included in the accounts 108). A particular geospatial tile can include credentials for Wi-Fi networks within a corresponding spatial region that the mobile device 302 is authorized to receive. By way of illustration, a first geospatial tile corresponding to a first spatial region retained in the data repository 106 for the mobile device 302 can include the credentials for the Wi-Fi network 1 314 and the Wi-Fi network 2 316. A second geospatial tile corresponding to a second spatial region retained in the data repository 106 for the mobile device 302 can include credentials for the Wi-Fi network X 318, and so forth. Thus, when the location detection component 306 determines that the mobile device 302 is within the first spatial region, the delivery component 310 can send credentials included in the first geospatial tile to the mobile device 302; however, the claimed subject matter is not limited to the foregoing example.

A geospatial tile can be a data structure that includes various types of sections. For instance, a geospatial tile can include a section pertaining to public open networks, a section pertaining to instructions for connecting to and accepting terms from captive portals, and a section that includes credentials for Wi-Fi networks personalized based upon relationships in one or more social networks. Upon receiving a geospatial tile, the network access component 312 can perform a scan for Wi-Fi networks specified in the geospatial tile. Based upon the scan, the network access component 312 can rank the Wi-Fi networks. Further, the network access component 312 can connect the mobile device 302 to a Wi-Fi network based upon the ranking.

Figure 4:
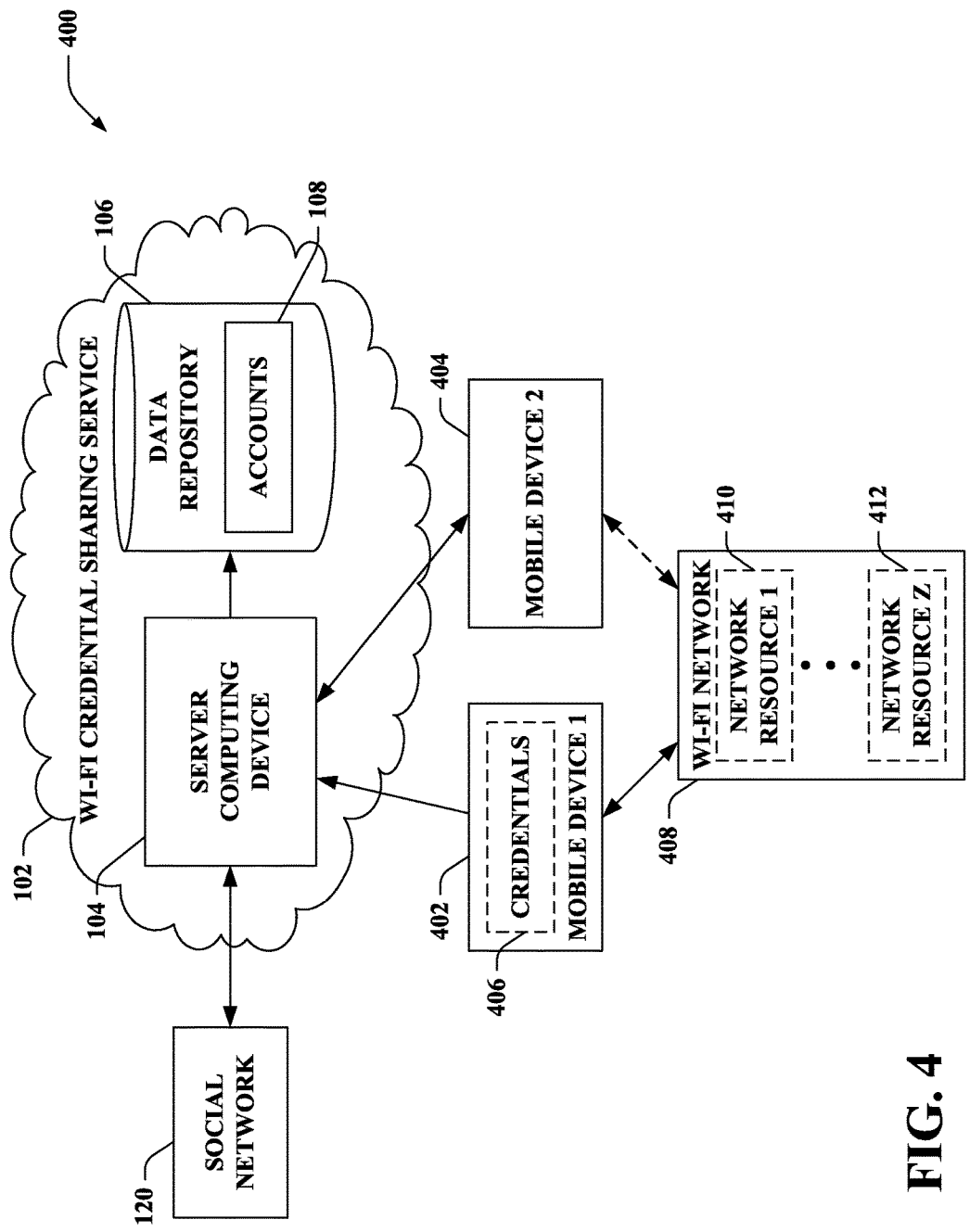
FIG. 4 illustrates a functional block diagram of an exemplary system that shares Wi-Fi credentials based upon relationships in a social network.

Now turning to FIG. 4, illustrated is a system 400 that shares Wi-Fi credentials based upon relationships in a social network. The system 400 includes the Wi-Fi credential sharing service 102, which includes the server computing device 104 and the data repository 106. As described herein, the data repository 106 includes accounts 108 of users of mobile devices.

The system 400 further includes a mobile device 1 402 and a mobile device 2 404. The mobile device 1 402 can include a data repository (not shown) that can retain credentials 406 for a Wi-Fi network 408. A user of the mobile device 1 402 can desirably share the credentials 406 for the Wi-Fi network 408 with his or her contacts from the social network 120. According to an example, a user of the mobile device 2 404 can be a contact of the user of the mobile device 1 402 in the social network 120. Accordingly, the credentials for the Wi-Fi network 408 can be included in an account of the user of the mobile device 2 404 within the accounts 108 retained in the data repository 106 of the Wi-Fi credential sharing service 102. As described herein, a subset of the credentials for the Wi-Fi networks shared with the user of the mobile device 2 404 can be transmitted from the server computing device 104 to the mobile device 2 404. Accordingly, the mobile device 2 404 can connect to the Wi-Fi network 408 (or a disparate Wi-Fi network (not shown)) utilizing corresponding credentials received from the server computing device 104.

By way of example, sharing of credentials for Wi-Fi networks can be reciprocal. Accordingly, credentials from the mobile device 1 402 can be shared with the mobile device 2 404, while credentials from the mobile device 2 404 can be shared with the mobile device 1 402 based upon the relationship in the social network 120 (e.g., the user of the mobile device 1 402 and the user of the mobile device 2 404 being contacts in the social network 120). By way of another example, one-way sharing of credentials can be employed. Thus, following the illustration shown in FIG. 4, the mobile device 2 404 need not shared credentials with the mobile device 1 402.

According to an example where reciprocal sharing of credentials is employed, an account of the user of the mobile device 1 402 retained in the data repository 106 can include credentials for Wi-Fi networks shared with the user of the mobile device 1 402 by the contacts of such user from the social network 120. Thus, the credentials included in the account of the user of the mobile device 1 402 can include credentials from the user of the mobile device 2 404 as well as disparate mobile devices of users that are contacts of the user of the mobile device 1 402 from the social network 120. Similarly, an account of the user of the mobile device 2 404 retained in the data repository 106 can include credentials for Wi-Fi networks shared with the user of the mobile device 2 404 by contacts of such user from the social network 120.

The Wi-Fi network 408 can include a plurality of network resources. More particularly, the Wi-Fi network 408 can include a network resource 1 410, . . . , and a network resource Z 412 (collectively referred to as network resources 410-412), where Z can be substantially any integer greater than or equal to two. The mobile device 1 402 can control rights of guests on the Wi-Fi network 408 utilizing the credentials 406 shared through the Wi-Fi credential sharing service 102. Thus, for instance, the mobile device 1 402 can specify a first subset of the network resources 410-412 of the Wi-Fi network 408 that are shared by the user and/or a second subset of the network resources 410-412 of the Wi-Fi network 408 that are inhibited from being shared by the user. Accordingly, the credentials for the Wi-Fi network 408 obtained by the mobile device 2 404 can allow the mobile device 2 404 to access the first subset of the network resources 410-412 of the Wi-Fi network 408 shared by the user and disallow accessing the second subset of the network resources 410-412 of the Wi-Fi network 408 inhibited from being shared by the user. By way of illustration, the network resource 1 410 can be shared by the user of the mobile device 1 402, while the network resource Z 412 can be inhibited from being shared by the user of the mobile device 1 402. Accordingly, when utilizing the credentials 406 received from the server computing device 104, the mobile device 2 404 can access the network resource 1 410, while being inhibited from accessing the network resource Z 412; yet, the claimed subject matter is not limited to the foregoing example.

In accordance with an example, the credentials 406 for the Wi-Fi network 408 shared with contacts of the user of the mobile device 1 402 can allow Internet access through the Wi-Fi network 408. Following this example, the credentials 406 can inhibit access to disparate network resources of the Wi-Fi network 408. Thus, network isolation can be provided by the system 400; however, the claimed subject matter is not so limited.

According to an example, a first subset of the network resources 410-412 of the Wi-Fi network 408 can be accessible to the mobile device 2 404 and a second subset of the network resources 410-412 of the Wi-Fi network 408 can be inaccessible to the mobile device 2 404 when the network access component of the mobile device 2 404 connects to the Wi-Fi network 408 utilizing corresponding credentials received from the server computing device 104. It is contemplated that the mobile device 2 404 (e.g., the network access component of the mobile device 2 404) can upgrade a connection of the mobile device 2 404 to the Wi-Fi network 408. For instance, the connection can be upgraded by having at least one network resource in the second subset of the network resources 410-412 being switch to being accessible to the mobile device 2 404. Thus, an upgrade can be supported by the system 400, where one or more restrictions can be removed. For instance, a guest in a home of a user of the Wi-Fi network 408 shared via the Wi-Fi credential sharing service 102 can be upgraded to full access from Internet-only access. It is contemplated that upgrades can be enabled by entering the credentials directly into the mobile device 2 404, for example. According to another example, a token can be supplied from the mobile device 1 402 to the mobile device 2 404 to enable upgrading (e.g., responsive to a physical gesture there between, via near field communication, etc.). Pursuant to yet another example, a message can be sent from the mobile device 2 404 to the mobile device 1 402 requesting upgraded access to network resources 410-412 of the Wi-Fi network 408. Following this example, the mobile device 1 402 can generate a prompt for a user to grant such upgrade. It is to be appreciated, however, that the claimed subject matter is not limited to the foregoing examples.

By way of another example, content restrictions can be predefined by an owner of a Wi-Fi network (e.g., the Wi-Fi network 408). Following this example, the owner of the Wi-Fi network can be a user of the mobile device 1 402. For instance, access to certain types or sources of content can be prohibited by the owner of the Wi-Fi network 408. According to another example, access to certain types or sources of content can be explicitly allowed only to certain types or sources of content by the owner of the Wi-Fi network 408.

Figure 5:
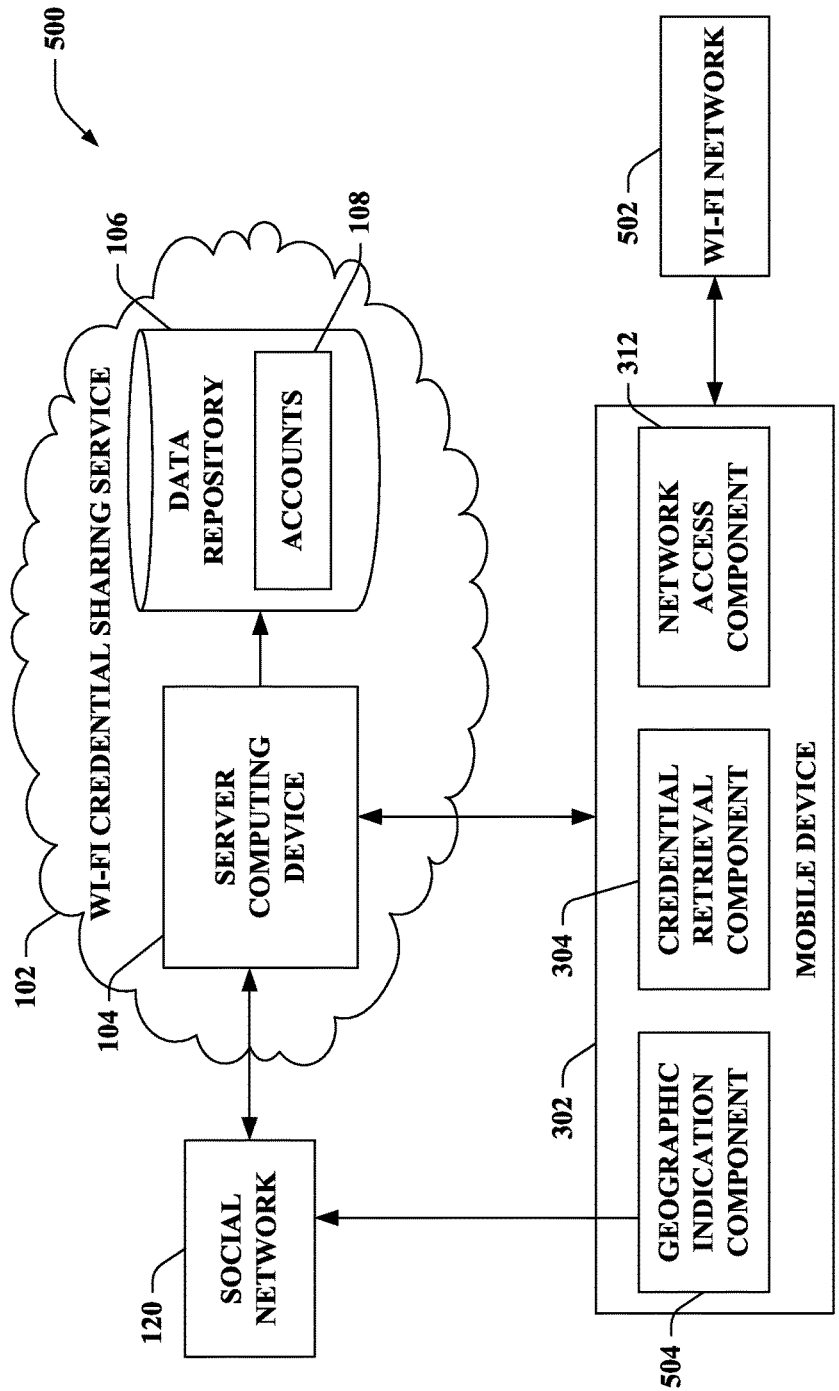
FIG. 5 illustrates a functional block diagram of an exemplary system that employs position notifications in a social network to enable access to a Wi-Fi network.

With reference to FIG. 5, illustrated is a system 500 that employs position notifications in a social network 120 to enable access to a Wi-Fi network 502. The system 500 includes the Wi-Fi credential sharing service 102. The Wi-Fi credential sharing service 102 includes the server computing device 104 and the data repository 106, which retains the accounts 108. Moreover, the system 500 includes the mobile device 302, which includes the credential retrieval component 304 and the network access component 312.

The mobile device 302 further includes a geographic indication component 504 that can transmit a position notification to the social network 120. The position notification can signify that the mobile device 302 is within a geographic location corresponding to a particular Wi-Fi network (e.g., the Wi-Fi network 502). The position notification desirably causes the user of the mobile device 302 to be checked in to the geographic location on the social network 120. The network access component 312 can connect the mobile device 302 to the Wi-Fi network 502 responsive to the user of the mobile device 302 being checked into the geographic location on the social network 120. Accordingly, the user of the mobile device 302 can check in using the social network 120 to receive access to the Wi-Fi network 502. It is to be appreciated that the geographic indication component 504 can automatically generate the position notification sent to the social network 120, for example. According to another example, the geographic indication component 504 can generate the position notification responsive to user input (e.g., manual input).

Pursuant to another example, other feedback related to an owner of the Wi-Fi network 502 (or user who shares credentials for the Wi-Fi network 502) can be provided from the mobile device 302 to the social network 120. For instance, a "like" feature, "follow" feature, "+1" feature, "recommend" feature, etc. of the social network 120 can be employed to provide feedback from the mobile device 302 to the social network 120. Moreover, the network access component 312 can connect the mobile device 302 to the Wi-Fi network 502 responsive to the feedback being provided to the social network 120 (e.g., provide feedback pertaining to a business to enable the network access component 312 to connect the mobile device 302 to a Wi-Fi network shared by the business, etc.).

Moreover, in accordance with various embodiments set forth herein, it is contemplated that users that attend an event or who are within proximity can be joined together to automatically form a social group in the social network 120. For instance, attendance or proximity can be determined based upon use of a common Wi-Fi network. Moreover, additional data mining of interest profiles and activities can be used to recommend such creation of the social group in the social network 120. Further, according to various embodiments, application developers can create applications that can form social groups based upon usage of shared Wi-Fi networks, which can be ingested by the platform; however, the claimed subject matter is not limited to the foregoing example.

FIGS. 6-9 illustrate exemplary methodologies relating to social network based sharing of Wi-Fi credentials. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 6:
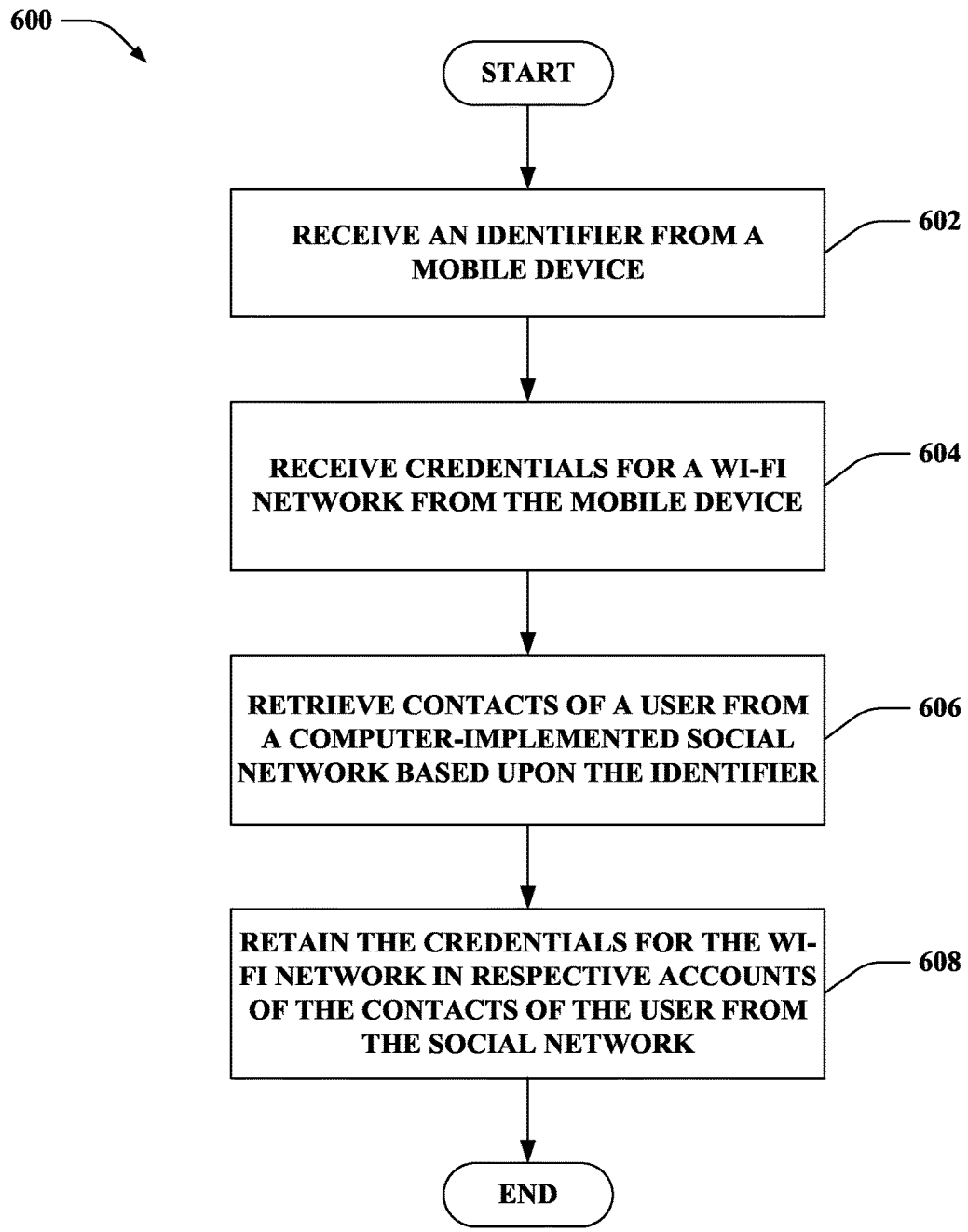
FIG. 6 is a flow diagram that illustrates an exemplary methodology for collecting credentials of Wi-Fi networks with at least one server computing device for sharing based upon social network relationships.

FIG. 6 illustrates a methodology 600 for collecting credentials of Wi-Fi networks with at least one server computing device for sharing based upon social network relationships. At 602, an identifier can be received from a mobile device. The identifier can identify a user of the mobile device. At 604, credentials for a Wi-Fi network can be received from the mobile device. The credentials for the Wi-Fi network can be desirably shared by the user. At 606, contacts of a user can be retrieved from a computer-implemented social network based upon the identifier. According to an example, it is contemplated that contacts of the user can also be retrieved from the mobile device (e.g., from an address book retained by the mobile device where the address book can be used as a social graph). At 608, the credentials for the Wi-Fi network can be retained in respective accounts of the contacts of the user from the social network. An account of a contact can include credentials for Wi-Fi networks shared with the contact.

Figure 7:
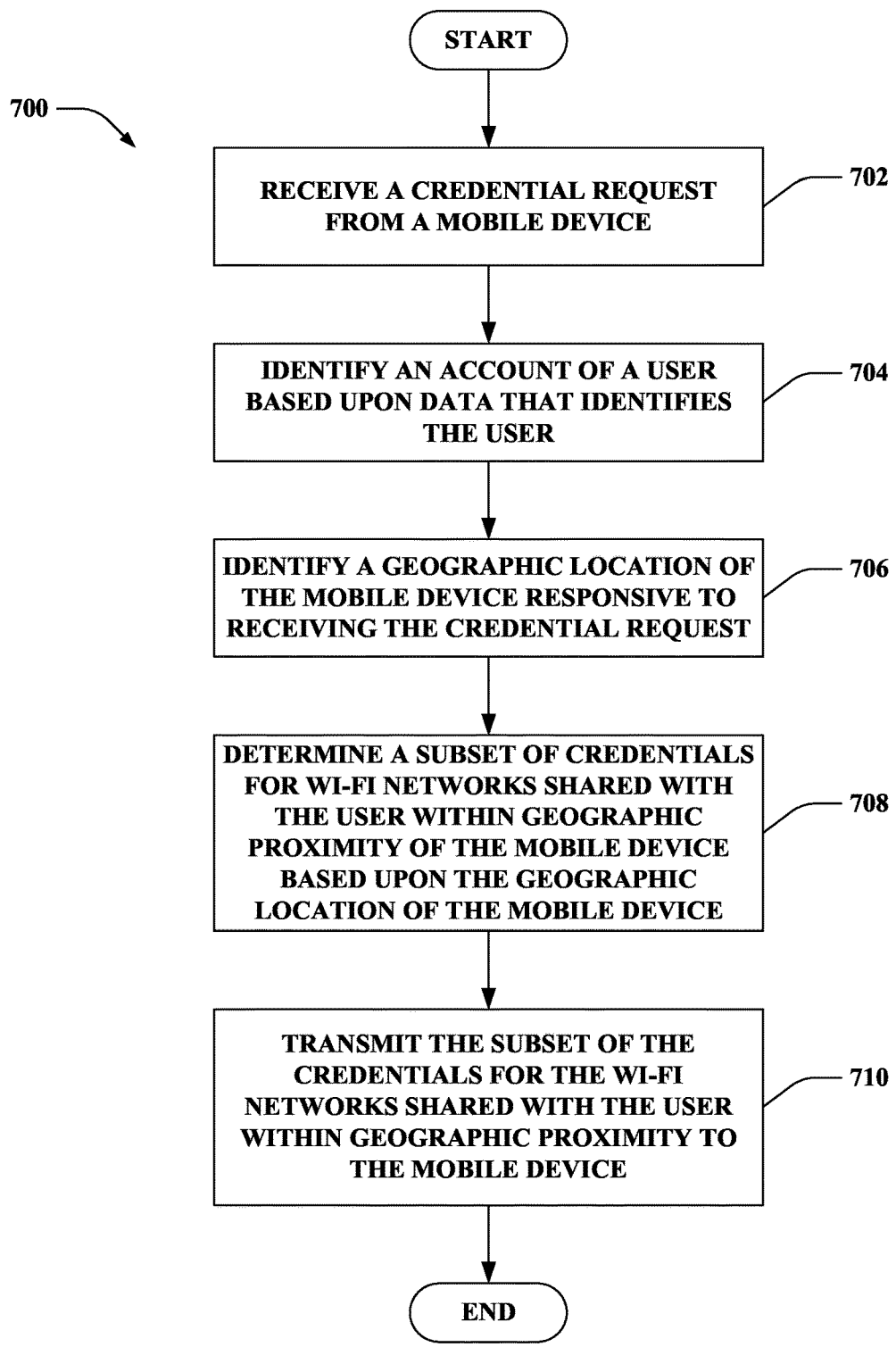
FIG. 7 is a flow diagram that illustrates an exemplary methodology for distributing credentials for Wi-Fi networks from at least one server computing device based upon relationships in a social network.

Turning to FIG. 7, illustrated is a methodology 700 for distributing credentials for Wi-Fi networks from at least one server computing device based upon relationships in a social network. At 702, a credential request can be received from a mobile device. The credential request can include data that identifies a user of the mobile device. At 704, an account of the user can be identified based upon the data that identifies the user. At 706, a geographic location of the mobile device can be identified responsive to receiving the credential request. At 708, a subset of credentials for Wi-Fi networks shared with the user within geographic proximity of the mobile device can be determined based upon the geographic location of the mobile device. Such determination can be responsive to identifying the account of the user and the geographic location of the mobile device. At 710, the subset of the credentials for the Wi-Fi networks shared with the user within geographic proximity can be transmitted to the mobile device.

Figure 8:
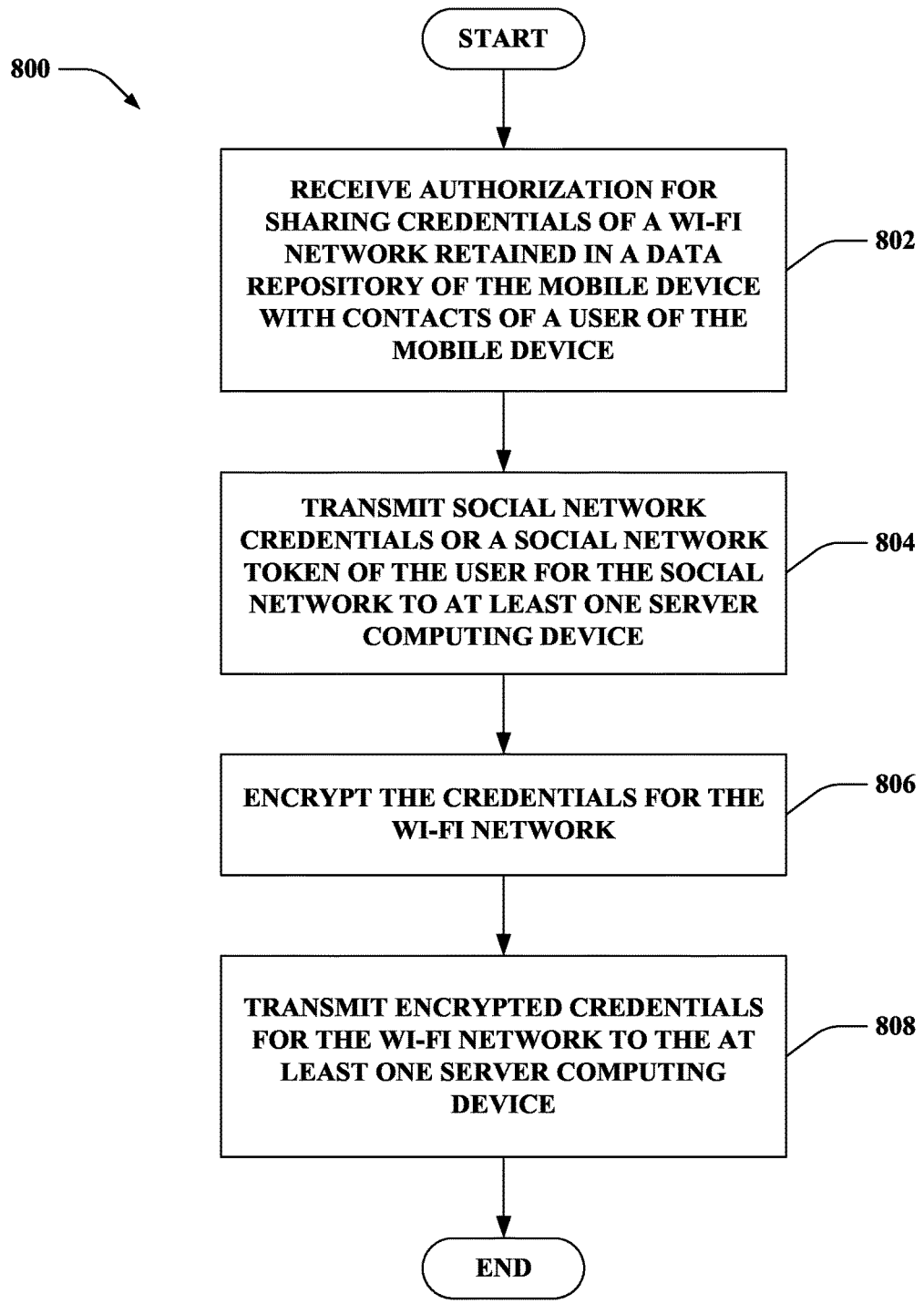
FIG. 8 is a flow diagram that illustrates an exemplary methodology for sharing credentials for a Wi-Fi network from a mobile device.

Now turning to FIG. 8, illustrated is a methodology 800 for sharing credentials for a Wi-Fi network from a mobile device. At 802, authorization for sharing credentials of a Wi-Fi network retained in a data repository of the mobile device with contacts of a user of the mobile device can be received. At 804, social network credentials or a social network token of the user for the social network can be transmitted to at least one server computing device. At 806, the credentials for the Wi-Fi network can be encrypted. At 808, encrypted credentials for the Wi-Fi network can be transmitted to the at least one server computing device.

Figure 9:
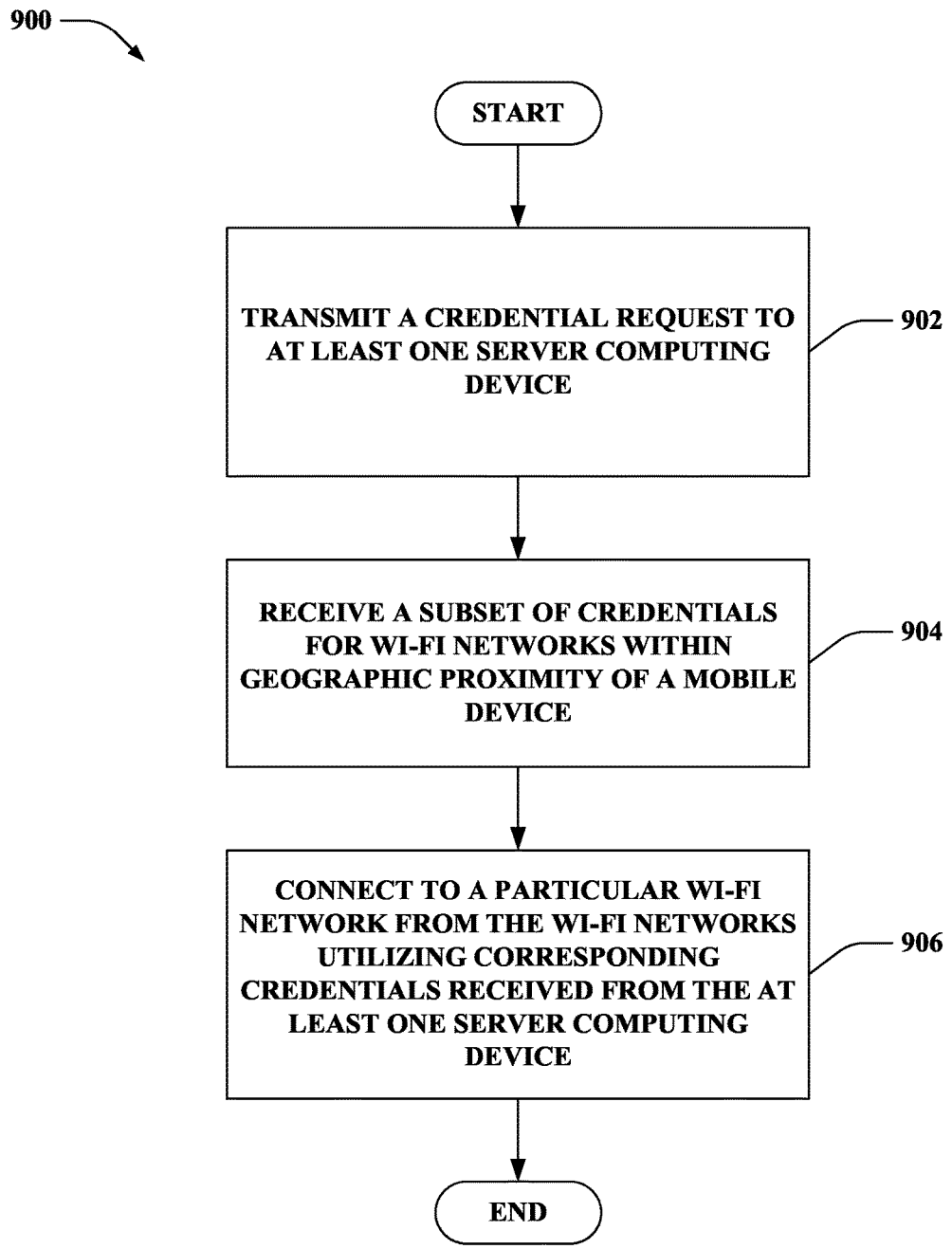
FIG. 9 is a flow diagram that illustrates an exemplary methodology for obtaining Wi-Fi credentials with a mobile device.

With reference to FIG. 9, illustrated is a methodology 900 for obtaining Wi-Fi credentials with a mobile device. At 902, a credential request can be transmitted to at least one server computing device. At 904, a subset of credentials for Wi-Fi networks within geographic proximity of the mobile device can be received. The subset of the credentials for the Wi-Fi networks within geographic proximity can be received by the mobile device responsive to the credential request. Moreover, the subset of the credentials for the Wi-Fi networks can be shared with a user of the mobile device by contacts of the user from a computer-implemented social network. At 906, a connection to a particular Wi-Fi network from the Wi-Fi networks can be established utilizing corresponding credentials received from the at least one server computing device.

Figure 10:
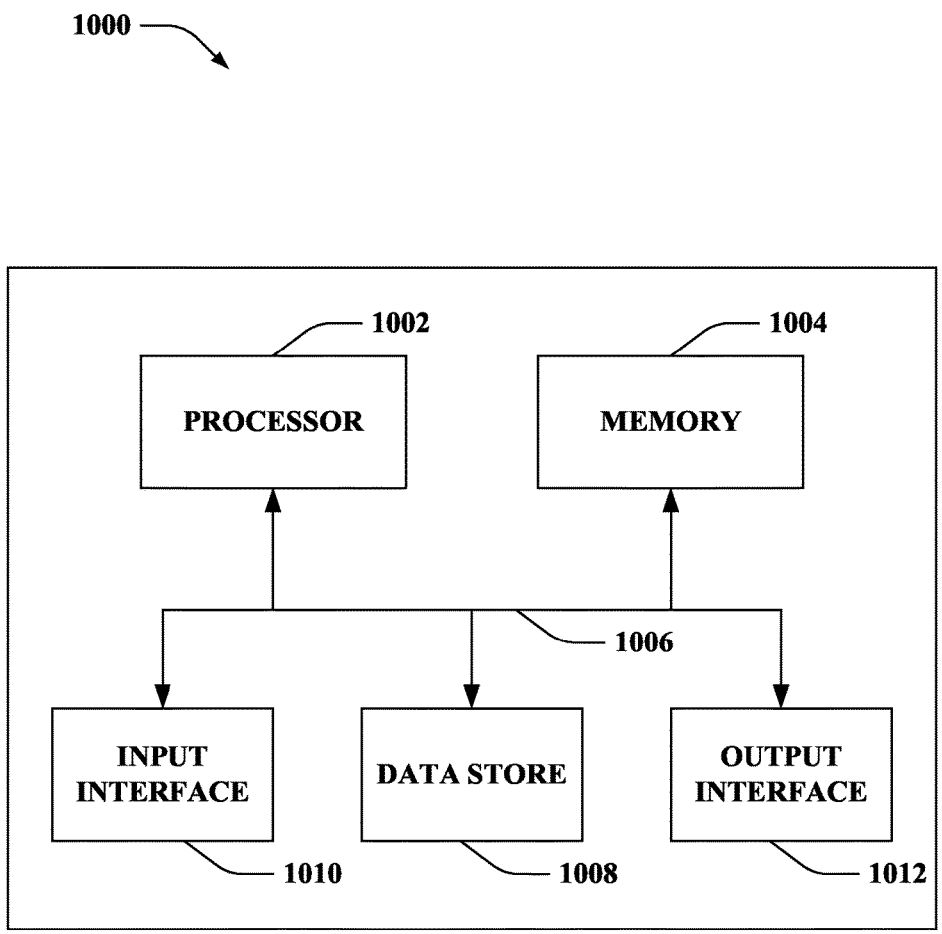
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be used in a system that shares Wi-Fi credentials based upon relationships in a social network (e.g., the computing device 1000 can be the server computing device 104). By way of another example, the computing device 1000 may be a mobile device that shares Wi-Fi credentials and/or receives shared Wi-Fi credentials. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store credentials, contacts, geospatial tiles, and so forth.

The computing device 1000 additionally includes a data store 1008 that is accessible by the processor 1002 by way of the system bus 1006. The data store 1008 may include executable instructions, credentials, contacts, geospatial tiles, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed by at least one server computing device, the method comprising:
receiving a social network token of a user from a first mobile device at the server computing device, wherein the first mobile device obtained the social network token of the user from a computer-implemented social network;
receiving credentials for a Wi-Fi network from the first mobile device at the server computing device, wherein the credentials for the Wi-Fi network are shared by the user through a Wi-Fi credential sharing service, wherein the Wi-Fi network comprises network resources, and wherein the network resources of the Wi-Fi network comprise Internet access through the Wi-Fi network and at least one of data in storage available via the Wi-Fi network or a device available via the Wi-Fi network;
querying, by the server computing device, a public graph application programming interface (API) for the computer-implemented social network using the social network token of the user to retrieve contacts of the user from the computer-implemented social network, wherein the contacts of the user retrieved from the computer-implemented social network are updated by the server computing device over time;
receiving, by the server computing device, data from the first mobile device that indicates at least one of network resources of the Wi-Fi network shared by the user through the Wi-Fi credential sharing service or network resources of the Wi-Fi network inhibited from being shared by the user through the Wi-Fi credential sharing service; and
retaining, by the server computing device, the credentials for the Wi-Fi network in respective accounts of the contacts of the user from the computer-implemented social network, wherein a particular account of a particular contact comprises credentials for Wi-Fi networks shared with the particular contact;
wherein the credentials for the Wi-Fi network shared through the Wi-Fi credential sharing service allow the contacts of the user from the computer-implemented social network to access the network resources of the Wi-Fi network shared by the user through the Wi-Fi credential sharing service and disallow the contacts of the user from the computer-implemented social network from accessing the network resources of the Wi-Fi network inhibited from being shared by the user through the Wi-Fi credential sharing service.

2. The method of claim 1, further comprising:
receiving a credential request from a second mobile device, wherein the credential request comprises data that identifies the particular contact;
identifying the particular account of the particular contact based upon the data that identifies the particular contact;
identifying a geographic location of the second mobile device responsive to receiving the credential request;
responsive to identifying the particular account of the particular contact and the geographic location of the second mobile device, determining a subset of the credentials for the Wi-Fi networks shared with the particular contact within a geographic proximity of the second mobile device based upon the geographic location of the second mobile device; and
transmitting the subset of the credentials for the Wi-Fi networks shared with the particular contact within the geographic proximity to the second mobile device.

3. The method of claim 2, further comprising transmitting time-to-live data to the second mobile device, wherein the time-to-live data controls a lifespan during which the Wi-Fi networks are accessible to the second mobile device using the subset of the credentials for the Wi-Fi networks.

4. The method of claim 1, further comprising:
retrieving differing contacts of the user from a disparate computer-implemented social network by querying a disparate public API for the disparate computer-implemented social network using a disparate social network token of the user for the disparate computer-implemented social network, the disparate social network token of the user being received from the first mobile device at the server computing device, wherein the first mobile device obtained the disparate social network token of the user from the disparate computer-implemented social network; and
retaining the credentials for the Wi-Fi network in respective accounts of the differing contacts of the user from the disparate computer-implemented social network.

5. The method of claim 1, further comprising:
receiving an update from the first mobile device, wherein the update revokes the credentials for the Wi-Fi network from being shared by the user; and
removing the credentials for the Wi-Fi network from the respective accounts of the contacts of the user from the computer-implemented social network.

6. The method of claim 1, further comprising:
receiving a set of credentials for the Wi-Fi networks shared by the user from the first mobile device, wherein the set of credentials for the Wi-Fi networks shared by the user comprises the credentials for the Wi-Fi network;
retaining the set of credentials for the Wi-Fi networks shared by the user in the respective accounts of the contacts of the user from the computer-implemented social network;
receiving an updated set of credentials for the Wi-Fi networks shared by the user from the first mobile device; and
replacing the set of credentials for the Wi-Fi networks shared by the user with the updated set of credentials for the Wi-Fi networks shared by the user in the respective accounts of the contacts of the user from the computer-implemented social network.

7. The method of claim 1, wherein an account of the user comprises credentials for Wi-Fi networks shared with the user by the contacts of the user from the computer-implemented social network.

8. The method of claim 1, wherein the credentials for the Wi-Fi networks shared with the particular contact through the Wi-Fi credential sharing service respectively allow the Internet access through the Wi-Fi networks and inhibit access to disparate network resources of the Wi-Fi networks, wherein the disparate network resources of the Wi-Fi networks are accessible by directly entering the credentials for the Wi-Fi networks.

9. The method of claim 1, wherein rights of the contacts of the user on the Wi-Fi network when connected to the Wi-Fi network utilizing the credentials for the Wi-Fi network shared through the Wi-Fi credential sharing service vary as a function of a parameter.

10. A mobile device, comprising:
at least one processor; and
memory that comprises computer-executable instructions that, when executed by the at least one processor, cause the at least one processor to perform acts including:
receiving authorization for sharing, through a Wi-Fi credential sharing service, credentials for a Wi-Fi network retained in a data repository of the mobile device with contacts of a user of the mobile device, the contacts of the user being from a computer-implemented social network, wherein the Wi-Fi network comprises network resources, and wherein the network resources of the Wi-Fi network comprise Internet access through the Wi-Fi network and at least one of data in storage available via the Wi-Fi network or a device available via the Wi-Fi network;
receiving, from the computer-implemented social network, a social network token of the user for the computer-implemented social network;
transmitting the social network token of the user for the computer-implemented social network to the Wi-Fi credential sharing service, the social network token of the user configured to be used by the Wi-Fi credential sharing service for querying a public graph application programming interface (API) for the computer-implemented social network to retrieve the contacts of the user from the computer-implemented social-network, wherein the contacts of the user retrieved from the computer-implemented social network are updated by Wi-Fi credential sharing service over time;
encrypting the credentials for the Wi-Fi network;
transmitting the encrypted credentials for the Wi-Fi network to the Wi-Fi credential sharing service; and
controlling rights of the contacts of the user on the Wi-Fi network such that one or more of the network resources of the Wi-Fi network are restricted from being accessed when respective mobile devices of the contacts of the user connect to the Wi-Fi network utilizing the credentials for the Wi-Fi network shared through the Wi-Fi credential sharing service.

11. The mobile device of claim 10, the memory further comprises computer-executable instructions that, when executed by the at least one processor, cause the at least one processor to perform acts including:
receiving, from the Wi-Fi credential sharing service, credentials for Wi-Fi networks shared with the user of the mobile device by the contacts of the user from the computer-implemented social network; and connecting the mobile device to a particular Wi-Fi network from the Wi-Fi networks utilizing corresponding credentials received from the Wi-Fi credential sharing service.

12. The mobile device of claim 11, wherein a first subset of network resources of the particular Wi-Fi network is accessible to the mobile device and a second subset of the network resources of the particular Wi-Fi network is inaccessible to the mobile device upon connecting to the particular Wi-Fi network utilizing the corresponding credentials received from the Wi-Fi credential sharing service.

13. The mobile device of claim 12, the memory further comprises computer-executable instructions that, when executed by the at least one processor, cause the at least one processor to perform acts including:

upgrading a connection of the mobile device to the particular Wi-Fi network from the Wi-Fi networks, wherein the connection of the mobile device to the particular Wi-Fi network is upgraded by having at least one network resource in the second subset of the network resources switched to being accessible to the mobile device.

14. The mobile device of claim 13, the memory further comprises computer-executable instructions that, when executed by the at least one processor, cause the at least one processor to perform acts including:

receiving a token supplied by a differing mobile device, the token supplied by the differing mobile device being received responsive to a physical gesture between the mobile device and the differing mobile device, wherein the connection of the mobile device to the particular Wi-Fi network is upgraded in response to receipt of the token supplied by the differing mobile device.

15. The mobile device of claim 13, the memory further comprises computer-executable instructions that, when executed by the at least one processor, cause the at least one processor to perform acts including:

transmitting a message requesting upgraded access to the at least one network resource, wherein the connection of the mobile device to the particular Wi-Fi network is upgraded in response to the upgraded access being granted.

16. The mobile device of claim 11, the memory further comprises computer-executable instructions that, when executed by the at least one processor, cause the at least one processor to perform acts including:

transmitting a position notification to the computer-implemented social network, the position notification signifying that the mobile device is within a geographic location corresponding to the particular Wi-Fi network, the position notification causes the user of the mobile device to be checked in to the geographic location on the computer-implemented social network; and connecting the mobile device to the particular Wi-Fi network from the Wi-Fi networks responsive to the user of the mobile device being checked in to the geographic location on the computer-implemented social network.

17. The mobile device of claim 10, wherein the rights of the contacts of the user on the Wi-Fi network utilizing the credentials for the Wi-Fi network shared through the Wi-Fi credential sharing service vary as a function of a parameter.

18. The mobile device of claim 10, the memory further comprises computer-executable instructions that, when executed by the at least one processor, cause the at least one processor to perform acts including:

receiving authorization for sharing the credentials of the Wi-Fi network retained in the data repository of the mobile device with contacts of the user from a disparate computer-implemented social network;

receiving, from the disparate computer-implemented social network, a social network token of the use for the disparate computer-implemented social network; and transmitting the social network token of the user for the disparate computer-implemented social network to the Wi-Fi credential sharing service, the social network token of the user for the disparate computer-implemented social network configured to be used by the Wi-Fi credential sharing service for querying a public graph application programming interface (API) for the disparate computer-implemented social network to retrieve the contacts of the user from the disparate computer-implemented social-network.

19. A method executed by a mobile device, the method comprising:

transmitting a credential request to a Wi-Fi credential sharing service;

responsive to the credential request, receiving, from the Wi-Fi credential sharing service, a subset of credentials for Wi-Fi networks within a geographic proximity of the mobile device, the subset of the credentials for the Wi-Fi networks being shared with a user of the mobile device through the Wi-Fi credential sharing service by contacts of the user, the contacts of the user being retrieved by the Wi-Fi credential sharing service from a computer-implemented social network responsive to the Wi-Fi credential sharing service querying a public graph application programming interface (API) for the computer-implemented social network using a social network token of the user, wherein the contacts of the user retrieved from the computer-implemented social network are updated by the Wi-Fi credential sharing service over time, wherein the mobile device obtained the social network token of the user from the computer-implemented social network and provided the social network token of the user to the Wi-Fi credential sharing service;

responsive to the receiving of the subset of credentials from the Wi-Fi credential sharing service, connecting to a particular Wi-Fi network from the Wi-Fi networks utilizing corresponding credentials from the subset of credentials shared through the Wi-Fi credential sharing service, wherein the particular Wi-Fi network comprises network resources, and wherein the network resources of the particular Wi-Fi network comprise Internet access through the particular Wi-Fi network and at least one of data in storage available via the particular Wi-Fi network or a device available via the particular Wi-Fi network; and responsive to the connecting to the particular Wi-Fi network utilizing the corresponding credentials from the subset of credentials shared through the Wi-Fi credential sharing service, accessing a first subset of the network resources of the particular Wi-Fi network utilizing the mobile device, wherein a second subset of the network resources of the particular Wi-Fi network is inaccessible to the mobile device utilizing the corresponding credentials from the subset of credentials shared through the Wi-Fi credential sharing service.

* * * * *